United States Patent [19]

Piramoon

[11] Patent Number: 4,781,669
[45] Date of Patent: Nov. 1, 1988

[54] COMPOSITE MATERIAL CENTRIFUGE ROTOR

[75] Inventor: Alireza M. Piramoon, Santa Clara, Calif.

[73] Assignee: Beckman Instruments, Inc., Fullerton, Calif.

[21] Appl. No.: 107,187

[22] Filed: Oct. 9, 1987

Related U.S. Application Data

[63] Continuation-in-part of Ser. No. 58,435, Jun. 5, 1987.

[51] Int. Cl.$^4$ .......................... B04B 1/00; B04B 7/08
[52] U.S. Cl. ..................................... 494/16; 156/172; 156/175; 494/81
[58] Field of Search .................. 494/81, 16, 37, 85, 494/43, 17; 156/169, 172, 173, 175

[56] References Cited

U.S. PATENT DOCUMENTS

| | | |
|---|---|---|
| 1,827,648 | 10/1931 | Greene . |
| 2,974,684 | 3/1961 | Ginaven et al. . |
| 3,913,828 | 10/1975 | Roy . |
| 3,993,243 | 11/1976 | Dietzel et al. . |
| 3,997,106 | 12/1976 | Baram . |
| 4,160,521 | 7/1979 | Lindren . |
| 4,468,269 | 8/1984 | Carey . |

*Primary Examiner*—Timothy F. Simone
*Attorney, Agent, or Firm*—William H. May; Paul R. Harder

[57] ABSTRACT

A composite material centrifuge rotor and process of construction of the rotor is disclosed. A rotor having high stiffness of fibers, preferably carbon, bound together with resin is disclosed. The rotor includes a top disk, a bottom disk and a spacer belt spacing the two disks apart to form a rotor assembly. The top and bottom disks are fabricated by overlying multiple layers of tape, the tape being made from longitudinally extending and parallel fibers held together with resin. The tapes are stacked in multiple layers normal to the spin axis of the rotor so as to lie within the plane of the centrifugal force exerted by the rotor. Successive layers of tape are oriented so as to vary the longitudinal direction of the fiber with respect to a preselected radius vector from the spin axis of the rotor. When the tape is compiled in multiple layers to a thickness of the top and bottom disk, the tape is compressed between two metal plates and cured at a temperature well above the expected autoclave temperature of sterilization of the rotor. Thereafter, a spacer belt consisting of a spirally wound resin impregnated and cured fiber is placed to space the top and bottom disks apart. Thereafter, the entire assembly is wound by a peripheral belt with resin impregnated high stiffness fiber. This fiber is cured and shrinks during curing to exert hoop tension around the periphery of the rotor assembly. This hoop tension in turn radially prestresses the rotor equal and opposite to the radial tension forces of centrifugal force when the rotor is in use.

A hub having a mount only to the lower plate is disclosed which effective cantilevers the rotor on the centrifuge spindle. A system of balancing inserts and interchangeable inserted buckets enables final balance of the rotor for the centrifuging of samples.

10 Claims, 5 Drawing Sheets

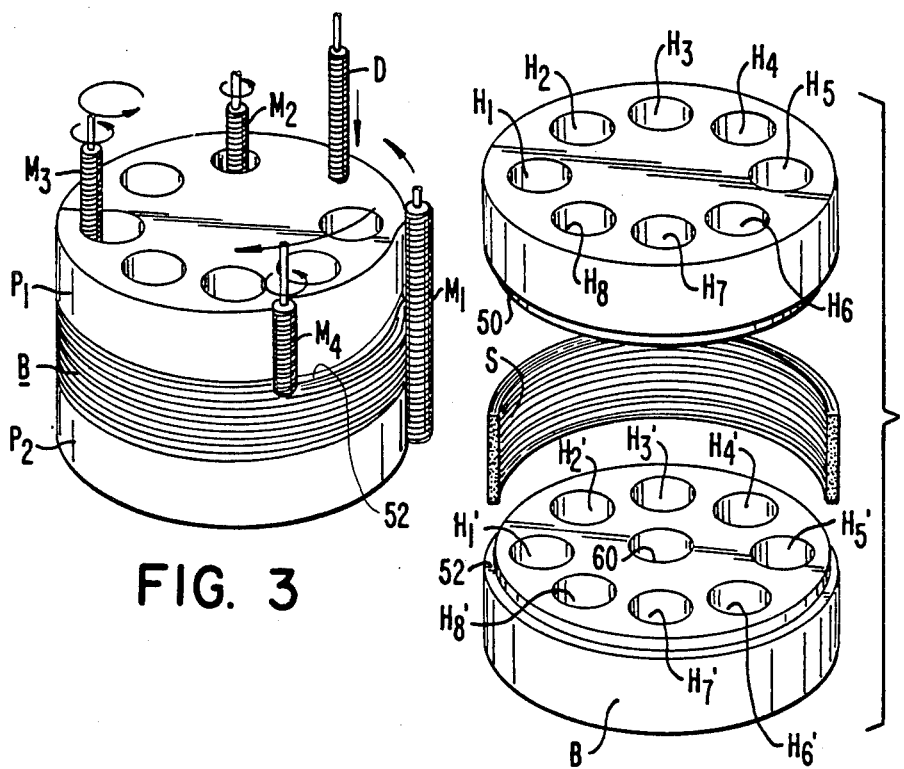
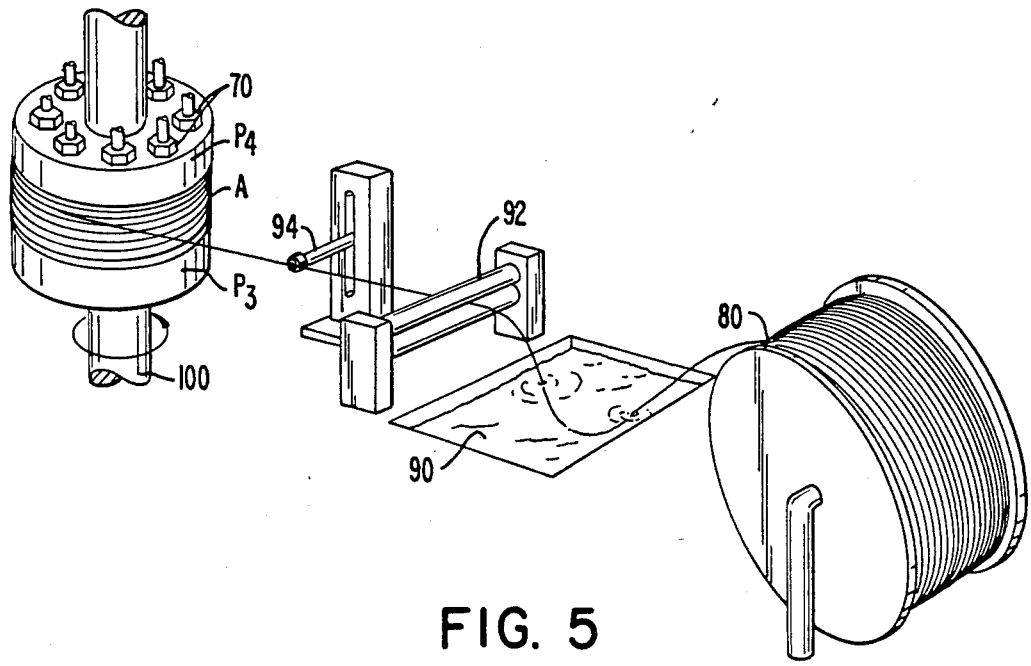
FIG. 3
FIG. 4
FIG. 5

COMPOSITE MATERIAL CENTRIFUGE ROTOR

This application is a continuation-in-part of application Ser. No. 58,435, filed June 5, 1987.

BACKGROUND OF THE INVENTION

This invention relates to centrifuges and more particularly to a composite material centrifuge rotor applicable for use in modern high speed or so called "ultracentrifuges".

SUMMARY OF THE PRIOR ART

An ultracentrifuge rotor may experience 600,000 g or higher forces which produce stresses on the rotor body which can eventually lead to rotor wear and disintegration. All ultracentrifuge rotors have a limited life before damage and fatigue of the material comprising the rotor mandates retirement from further centrifuge use.

Stress generated by the high rotational speed and centrifugal forces arising during centrifugation is one source of rotor breakdown. Metal fatigue sets into conventional rotors following a repeated number of stress cycles. When a rotor is repeatedly run up to operation speed and decelerated, the cyclic stretching and relaxing of the metal changes its microstructure. The small changes, after a number of cycles, can lead to the creation of microscopic cracks. As use increases, these fatigue cracks enlarge and may eventually lead to rotor failure. The stress on conventional metal body rotors may also cause the rotor to stretch and change in size. When the elastic limits of the rotor metal body have been reached, the rotor will not regain its original shape, causing rotor failure at some future time.

Metal rotors are usually constructed of titanium and aluminum alloys. Titanium and aluminum alloy rotors have a respectably high strength to weight ratio. Aluminum rotors are lighter weight than titanium, leading to less physical stress and a lower kinetic energy when run at ultracentrifuge speeds; however, titanium rotors are more corrosive resistant than aluminum. As the ultracentrifuge performance and speeds have increased, the safe operating limits of centrifugation have been reached by conventional metal rotors.

One attempt to overcome the design limitations imposed is indicated in U.S. Pat. No. 3,997,106 issued to Baram for a centrifuge rotor which is laminated and consists of two layers of different materials. Wires (24) are wound around a metal cover 8b which surrounds a central filler of chemically resistant plastics (See FIG. 3 of the '106 patent). The Baram '106 patent envisions greater chemical resistance and lower specific gravity rotors, which achieve optimum strength, by the use of a laminate manufacturing process. U.S. Pat. No. 2,974,684 to Ginaven (2,974,684) is directed to a wire mesh of woven wire cloth 6 for reinforcing a plastic material liner 7 for use in centrifugal cleaners (see FIGS. 2 and 3).

U.S. Pat. Nos. to Green (1,827,648), Dietzel (3,993,243) and Lindgren (4,160,521) have all been directed to a rotor body made from resin and fibrous reinforcement materials. In particular, Green '648 is fiber wound to produce a moment of inertia about the vertical axis greater than the momeent of inertia about the horizontal axis through the center of gravity of the bucket so that the rotor bucket is stable at speeds of 7500 to 10,000 RPM (a relatively slow centrifuge speed by modern standards.)

U.S. Pat. No. 4,468,269, issued Aug. 28, 1984 to the assignee of this application, discloses an ultracentrifuge rotor comprising a plurality of nested rings of filament windings surrounding the cylindrical wall of a metal body rotor. The nested rings reinforce the metal body rotor and provide strengthening and stiffening of the same. The rings are nested together by coating a thin epoxy coat between layers. U.S. Pat. No. 3,913,828 to Roy discloses a design substantially equivalent to that disclosed by the '269 patent.

None of the conventional designs provide maximum strength through ultracentrifuge speeds through the use of a material specifically designed to accommodate localized stress and resist rotor body fatigue. Conventional metal bodies, or reinforced metal body rotors, are subject to metal stress and fatigue failures during centrifugation.

What is needed is a rotor body of substantial strength, yet lighter in weight and capable of enduring increasingly higher loads and speeds. The body should resist stress and corrosion and be specifically designed to cope with localized stress.

Metal rotors have the convenience of being adaptable to well known metal working techniques. Providing that reasonable care is utilized in metal working and abrupt metallic interfaces are avoided, the isotropic strength and materials property of metal remains unchanged. That is to say all the metallurgical properties of metal are substantially unchanged in any given direction of the metal with respect to the spin axis of the rotor.

DEFINITION

In the following material, it will become apparent that the disclosed composite rotor does not include isotropic properties. In fact, the rotor is specifically designed to have maximum resistance against centrifuged induced radial tension along planes parallel to the spin axis of the rotor. Applicant will utilize the term "anisotropic" to describe this property.

SUMMARY OF THE INVENTION

A composite rotor and process of composite rotor construction is disclosed. The composite rotor is constructed of resin reinforced fibers. The rotor includes a top disk, a bottom disk and a spacer belt separating the two disks to form a rotor assembly. The rotor assembly is in turn bound on the periphery by a wound and shrunk resin fiber belt providing hoop tension around the entire periphery of the rotor assembly. This hoop tension in turn supplies to the rotor assembly radial pretension equal and opposite to anticipated dynamic radial loading during high speed centrifuge spinning of the completed rotor.

The top and bottom disks are fabricated from overlying multiple layers of tape. The tape is made from longitudinally extending high stiffness fibers held together with resin. The tapes are stacked in multiple layers in the plane of the centrifugal force exerted by the rotor. As the tapes are stacked, they are oriented so as to vary the longitudinal and radial direction of the high stiffness fibers.

A preferred pattern of variation of the high stiffness fibers is disclosed. An arbitrary radius is selected with respect to the anticipated spin axis of the rotor. Successive layers of tape are layered with their longitudinally extending fibers at 0°, 45°, −45°, and finally 90° to the selected arbitrary radius. This pattern is repeated until the tape is compiled in multiple layers to the preferred thickness of the top and bottom disks, this thickness being in the order of 1.6 inches or less.

Thereafter, the tape for each of the disks is compressed between two metal pressing plates, the pressing plates being typically of aluminum or steel. The tape has resin with a cure temperature which is selected to be well above the anticipated autoclave temperature of sterilization of the rotor. For example, the cure temperature of the tape could be 350° or above while the anticipated autoclave temperature would be 260° or below.

When the layers are cured, the rough edges of the tapes are removed by machining, typically by the use of an end mill. The end mill is operated to trim the tape edges while the cured disc still remains securely clamped. For this clamping the original pressing plates may be used; alternately, other plates may be substituted.

The metal pressing plates are then further utilized to maintain the integrity of the upper and lower disks while necessary holes or cavities for receiving the drive hub and centrifuge sample buckets are configured. These holes are typically made by drilling a pilot hole and thereafter introducing an end mill to gradually relieve the hole from the pilot hole diameter to its full diameter in successive increments without disturbing the lamination.

The discs are preferably notched at their confronting surfaces by the end mill to receive a radially wound fiber ring. When the discs are confronted over the ends of the fiber ring, a rotor assembly is formed.

This rotor assembly is placed between two second spool plates and thereafter wound with a resin dipped fiber tow under tension to the full thickness of a peripheral radial belt around the rotor assembly. This belt is cured (again in the range of 350° F. or less) with the result that the radial belt shrinks on the rotor assembly and is under high hoop tension around the exterior of the rotor assembly. It should be noted that the curing temperature of the belt resin is chosen to be somewhat less than 350° so that thermal damage does not occur to the previously cured rotor assembly.

The hoop tension is chosen so that the belt radially pretensions the rotor assembly with a force that exceeds any dynamic centrifugal force on the belt at designed centrifuge speed. There results a rotor having about 25% the weight of an all metal titanium rotor which enables faster acceleration and deceleration to centrifuging speed and reduces both containment requirements and drive train wear.

When the rotor disclosed herein is fully loaded with buckets, sample tubes and mounted on a centrifuge the resultant assembly is 60% lighter than an all metal (titanium) prior art counterpart.

A hub having a mount only to the lower plate is disclosed which effective cantilevers the rotor on the centrifuge spindle. A system of balancing inserts and interchangeable inserted buckets enables final balance of the rotor for the centrifuging of samples.

OTHER OBJECTS AND ADVANTAGES

An object of this invention is to set forth a unitary disc construction and process of disk construction from which rotor plates an be manufactured. According to this aspect of the invention, sequential layers of tape consisting of longitudinally extending stiff fibers, such as carbon are overlaid one to another. The successive layers of tape are placed at differing angular intervals with respect to the direction of the fibers. For example at 0°, 45°, −45°, and 90° with respect to any preselected direction. Thereafter, the laminate layers of tape are clamped between two pressing plates and cured at a curing temperature of the resin. Thereafter, the edges of the tape are worked, as by trimming with an end mill to form a unitary disk.

An advantage of the disk construction is that it has an anisotropic radial reinforcement with fibers of great stiffness. The fibers oriented at one radial direction in one layer can transmit their stiffness through the cure resin to fibers oriented at a different radial direction at a different adjacent layer.

Yet another advantage of the disk construction is that the disk can be fabricated up to a practical limit of about 1.6 inches. From the fabricated disk, a composite rotor construction can be made.

A further object of this invention is to set forth a method for placing sample holes in the laminated disks. According to this aspect of the invention, the pressing plates are maintained on the disk. Thereafter, access pilot holes are drilled in the disk. Finally, end mills, preferably sonically vibrated, are used to incrementally expanding the pilot holes to the full intended sample hole diameter.

An advantage of this aspect of the invention is that the laminated disk may be worked to essentially the same tolerance as an all metal rotor without delamination or damage.

A further object of this invention is to set forth a process of radially pretensioning a rotor opposite to anticipated dynamic tensioning during centrifuging radial. According to this aspect of the invention, a rotor assembly, including the disk is captured between two spool plates extending beyond the side edges of the disk so as the plates and disk together form a winding spool. A resin impregnated tow of fiber, typically containing 3,000 or higher strands, is wound under tension (in the order of 20 lbs.) onto the spool. Thereafter, the resin impregnated fiber is cured and shrinks over the rotor assembly including the disk. A radial pretensioning of the disk results.

An advantage of this aspect of the invention is that the fiber winding, when cured and shrunk, radially prestresses the rotor disk equal and opposite to the dynamic radial loading of centrifuging. An interference fit between the radial band and the rotor disk is created which does not become separated upon centrifuging.

A further object of this invention is to set forth a hollow rotor construction. According to this aspect of the invention, two disks, a top disk and a bottom disk are confronted across a wound fiber radial spacer to form a rotor assembly. Thereafter, the rotor assembly is wound under tension with resin impregnated fiber. The fiber is cured and simultaneously shrinks over the rotor assembly to pretension the top and bottom disk and spacer radially. A hollow, unitary rotor results.

An advantage of this aspect of the invention is that the density of the rotor is vastly reduced. Not only is the fiber laminate construction ⅓ the density of titanium but the hollow construction of the rotor further reduces the weight of the rotor in the order of about 25% over the weight of a titanium rotor of equal size.

Yet another advantage is that the rotor has imparted anisotropic radial stiffness. That is to say the stiffness is normal to the rotor spin axis and in the direction of radial stress imparted by centrifugal force from the spin axis. Fibers having a stiffness of up to 70 million lbs/inch$^2$ may be used (as distinguished from titanium having a stiffness of 15 million lbs./inch$^2$). Further, the stiffness of the fiber can be varied for the particular rotor construction utilized.

An advantage of the rotor is that acceleration and deceleration times are vastly reduced. Thus, long dwell times, while the samples reaches centrifuging speed or decelerates from centrifuging speed, are no longer required. Consequently, the classifying cycle time for specimens is reduced. Both operator savings and apportioned centrifuge costs per sample are likewise reduced.

A further advantage of the requirement is that since the rotor is lighter, the kinetic energy contained in a high speed rotor spinning at centrifuging speed is reduced. Consequently, the containment requirements of the centrifuge can be reduced. Containment belts can either tolerate a higher speed rotor of the disclosed construction or alternatively can be lightened when used exclusively with composite rotors.

Yet a further advantage of the light composite rotor is that it produces less bearing and drive train wear on the centrifuge. Moreover, since the rotor is of lighter construction, the effects of rotor imbalance are lessened.

Yet an additional advantage of the disclosed rotor is that it is hollow. Consequently the hollow portions of the rotor do not contribute to centrifugal dynamic loading. Only the disks and radial belts contribute to centrifugal dynamic loading.

An object of this invention is to set forth a drive hub for the support of the composite rotor, both during construction of the rotor and when the rotor is on the centrifuge. According, the bottom disc of the rotor has a hub with pilot hole shrunk fit within the single central aperture of the bottom disc. Thereafter, a nut is preferably placed over the hub. The rotor is thereafter assembled with the top disc, and spacer belt followed by the winding belt for pretensioning of the rotor. Using the outside diameter of winding belt as a reference, the pilot hole in the hub is concentrically enlarged and machined to include detail for spindle drive in a conventional centrifuge.

An advantage of the hub construction is that the top disc of the rotor is left intact. This intact construction of the top disc enables this disc to receive high loadings during centrifuging, these high loadings including the cap and metal spacer utilized with the interchangeable buckets.

A further advantage of the hub construction is that the hub can be bored after rotor assembly with a finished central dimension that is concentric to the finished outside of the rotor. This finish boring assists in the ultimate balance of the rotor as well as providing a wear surface for engagement with the centrifuge drive spindle.

Yet another advantage of the disclosed hub construction is that it effectively cantilevers the rotor with respect to the centrifuge spindle for simplified attachment to the centrifuge.

A further object of this invention is to disclose a technique for the balancing of the rotor. According to this aspect of the invention, metal sleeve inserts are shrunk fit in the individual sample cells at the top and the bottom. These sleeves include a protruding flange, which flange is later machined away for balancing of the rotor. Thereafter, identical weighted and dimensioned sample buckets are placed within the rotor and the rotor is spun. Acceptable balance of the composite rotor occurs.

An advantage of the identically dimensioned and weighted sample buckets is that they reinforce the balancing inserts against the dynamic forces of the centrifuge. By having the combination of an inserted bucket and the balancing insert, the balancing insert can withstand the force of the centrifuge, which force would otherwise tear the inserts from their shrunk fit insertion.

A further advantage of the balancing insert is that the sample buckets are interchangeable. It is not required that the user place the buckets within the centrifuge in an order especially designed to achieve rotor balance.

Other objects, features, and advantages of this invention will become more apparent after referring to the following specification and attached drawings in which:

FIG. 3 is a perspective schematic illustrating the disk of FIG. 2 with the working tool of an end mill forming sample bucket holes and a spacer ring notch, the particular disk here illustrated being a bottom disk;

FIG. 4 is a perspective schematic illustrating top and bottom disks trapping a radially wound spacer ring there between to form a rotor assembly of this invention;

FIG. 5 illustrates the rotor assembly of FIG. 4 clamped between two spool plates with the assembly being radially wound with a resin impregnated tow of carbon fibers immediately prior to curing and shrinking of the fibers to complete the rotor illustrated in FIG. 1.

Figure 1:
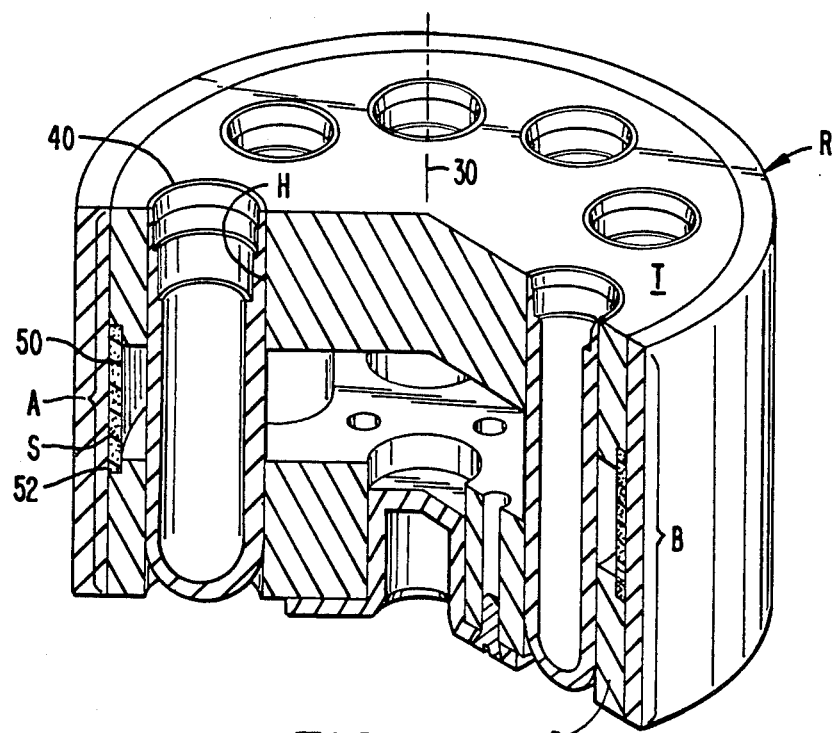
FIG. 1 is a perspective view of the completed rotor of this invention broken away to identify the component parts.

Referring to FIG. 1, a completed rotor R is illustrated having top disk T and bottom disk B confronted across spirally wound spacer ring S to form a rotor assembly A.

Rotor assembly A is wound by a tensioned belt B. As will be hereinafter become apparent, belt B exerts a radial tension inwardly on the rotor assembly A. This inward radial compression is opposite to the dynamic radial tension that occurs during centrifuging.

The rotor construction is hollow. Consequently, a sample bucket is placed within the rotor as shown in FIG. 1. The sample bucket has sufficient side wall thickness to resist all centrifugal forces on the sample and is constructed from conventionally forged and machined titanium.

Figure 2:
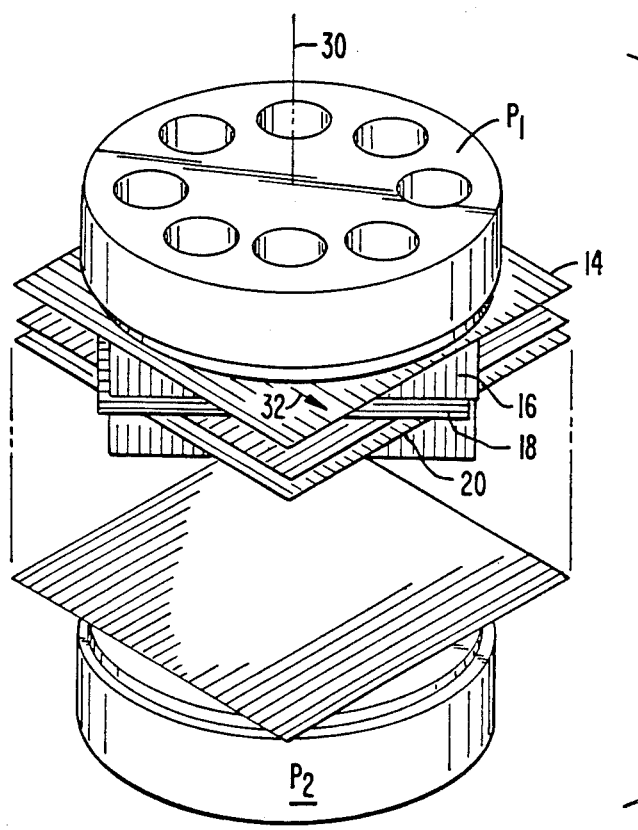
FIG. 2 is a perspective schematic illustrating the fabrication of either the top or bottom disk of the rotor of FIG. 1 showing specifically the placement of the longitudinally reinforced fiber laminated layers in an alternately radial pattern between upper and lower clamping and curing plates.

In describing the invention, the fabrication of the top and bottom disks will first be set forth with respect to FIGS. 2 and 3.

Secondly, the construction of the rotor assembly will be explained with respect to FIG. 4.

Finally, the fabrication and shrinking of the belt B over the rotor assembly A will be set forth with respect to FIG. 5.

Referring to FIG. 2, the process for the formation of disks T and B is illustrated. Typically, two aluminum pressing plates P1 and P2 are used as part of a press mechanism (otherwise not shown) for the curing of the individual laminated layers. The disks are each formed from approximately 240 to 250 layers of tape trapped between the pressing plates.

The tape consists of parallel strands of longitudinally extending fiber having high stiffness impregnated and held together with partially cured resin. The tape is cut in typically square sections to exceed the full diameter of the rotor. Such tape can be purchased from the Celonease Plastic & Specialties Company of Chatam, N.J. The tape is sold under the trademark CELION 12K.

The tape comprises fiber tows having 12,000 fiber in each tow. The curing temperature of the resin utilized for holding the fiber together in the commercial tape is in the range of 350°. This 350° temperature is selected to be well above the 260° F. autoclave temperature of sterilization of the completed rotor assembly.

Orientation of the tape is specifically illustrated. Referring to FIG. 2, it will be seen that spin axis 30 of the rotor has an arbitrary radius 32 taken normal to spin axis 30. It will be appreciated that all of the individual laminate layers 14, 16, 18. and 20 of the rotor are normal to spin axis 30. It is in this plane that the disk is required to have the improved anisotropic properties set forth herein.

The fibers of layer 14 are all aligned parallel to radius vector 32. The fiber of layers 16 are oriented clockwise 45° (+45°) using the convention herein from the fibers of layer 14.

The fibers of layer 18 are counterclockwise from the fibers of layer 14 at 45° (−45° using the convention herein). Finally, the fibers of layer 20 are placed at right angle to those fibers of layer 14.

The disk is fabricated by many successive layers. Utilizing the apparatus herein shown, as many as 250 layers of such tape can be utilized to build a disk 1.6 inches in height. As the layers are stacked, the variation of the fibers angulation is repeated as described. Once the tape is compiled to the full height of the disk, both curing and pressing occur.

The reader will appreciate that woven fibers constituting fabric having straight woven fibers could as well be used.

Typically the press plates with the trapped tape layers are placed within an oven elevated to the required curing temperature of 370°. Thereafter, the plates are urged towards one another under gradually increasing compression. Initially, the compression begins at 25 lbs/inch$^2$. Over a period of 4 hrs, the pressure between the plates P1 and P2 is increased. The pressure increases in increments until, at the end of 4 hrs., a total pressures of 200 lbs./inch$^2$.

Total curing time is 6 hrs. at the 350° temperature. The reader will appreciate that the final two hours of curing occurs at the full 200 lbs/inch$^2$ pressure between plates P1 and P2.

Once pressing and curing is completed, the successive tape layers between the plates will extend outwardly from the plates in a "dog eared" fashion. Trimming is required.

Referring to FIG. 3, trimming can be understood. Typically, plates P1 and P2 will be clamped towards one another by clamps (not shown). Thereafter, an end mill M1 typically rotating and trimming around the periphery of plates P1, P2 and disk B therebetween will trim the side edge debris from bottom disk B. Preferably end mill M1 is provided with ultrasonic vibration and the trimming cuts of the end mill M1 are made incrementally so as to not interfere with the lamination of the individual layers of bottom disk B.

It will be remembered from FIG. 1 that the finished rotor includes hole H having sample bucket 40 therein. It is bucket 40 which contains the sample which is classified during centrifugation.

Forming the precise aperture for the sample bucket 40 is illustrated with respect to FIG. 3. Typically a drill D1 penetrates plate P1, disk B and plate P2 therebelow. Thereafter, an end mill M2 gradually machines out the pilot hole of drill D. Referring to end mill M3, the mill is shown completing hole H for the sample bucket 40 within the rotor.

I have found that if the sample holes are 1 to 1.5 inches in diameter, a pilot hole in the order of ½ inch can be drilled. Thereafter, an end mill is utilized to cut away no more than 20/1000ths of an inch at a time. It is preferred if the end mill is sonically vibrated.

Referring back again to FIG. 1, it will be understood that rotor assembly A includes notch 50 in upper disk T and notch 52 in lower disk B. Machining of notch 52 in lower disk B is illustrated in FIG. 3.

In FIG. 3, an end mill M4 is shown creating notch 52. This notch 52 is sized to receive a fiber wound spacer belt S.

Construction of the fiber wound spacer belt can be understood by referring to my co-pending patent application entitled Composite Material Rotor conceived with my co-inventor, Robert Carey, patent application Ser. No. 849,911, filed Apr. 9, 1986, now U.S. Pat. No. 4,738,656, issued 849,911. Simply stated, spacer belt S is formed by winding individual fibers over an aluminum mandril and curing those fibers to form the spacer belt. Thereafter, mandril is cryogenically cooled and removed. Once the mandril is removed, the resultant cylinder of fiber wound resin impregnated particles can be cut to form spacer belts S of the desire length.

Referring to FIG. 4, the rotor assembly A can be understood. The rotor assembly A includes a top disk T, a bottom disk B and spacer belt S therebetween. Notch 52 on bottom disk B receives the bottom portion of spacer belt S. Notch 50 on top disk T receives the upper portion of spacer belt S. The entire rotor assembly is fitted together, ready for final winding as illustrated in FIG. 5.

It will be appreciated that top disk T includes 8 holes H1-H8. These holes are aligned to register with holes H1'-H8' in bottom disk B. Additionally, bottom disk B includes a hub hole 60 which hole provides for an attachment of the spin apparatus of the rotor.

There now remains to be described the placement of belt B on the exterior of the rotor assembly A. This can be understood with respect to the schematic of FIG. 5.

Referring to FIG. 5, rotor assembly A has been trapped between two spool plates P3 and P4. These respective spool plates are bolted across rotor assembly A by bolts 70 extending through the respective holes H1-H8 and corresponding holes H1′, H8′. Plates P3 and P4 extend radially beyond the side edges of the spin assembly A. This enables winding of belt B.

Belt B is formed from a multifiber tow. The fiber is lead from a spool 80 and dipped through a resin bath 90. The fiber then passes through a brake 92 and a bobbin mechanism 94. Bobbin 94 tends to feed the multiple stranded fiber tow onto and over the periphery of the rotor assembly A.

The rotor assembly A is typically spun on a shaft 100. It is spun under a torque so that the fiber tow extending between brake 92 and rotor assembly A is approximately under 20 lbs. of tension. Bobbin mechanism 94 enables the fiber to be placed over the surface of the rotor mechanism A in an even distribution.

The particular fiber herein used is manufactured by the Union Carbide Corporation of Concord, Calif. in the Specialty Polymers and Composites Division. It is sold under the trademark THORNEL T-40. In this particular case it has a stiffness of 40 million lbs./inch$^2$. The fiber has a group of individual strands bound together in a tow which tow contains approximately 3,000 or more strands.

Once the fiber is wound to a thickness of belt B, the two plates P3 and P4 and the wound fiber are cured, again utilizing a resin having a curing temperature in the range of 370°. This construction causes the fibers to shrink over the periphery of rotor assembly A.

It will be understood that the belt B exerts a hoop tension around the periphery of the rotor assembly A. This hoop tension actually causes the diameter of belt A to shrink by as much as 3,000ths of an inch, for a rotor having a diameter on the order of approximately 8 inches. More importantly, belt B exerts upon the rotor assembly A a radial tension. This radial tension is inward and to and towards the spin axis 30 of the rotor. It is opposite to and always in excess of the forces dynamically produced in the rotor during centrifuging.

Figure 6:
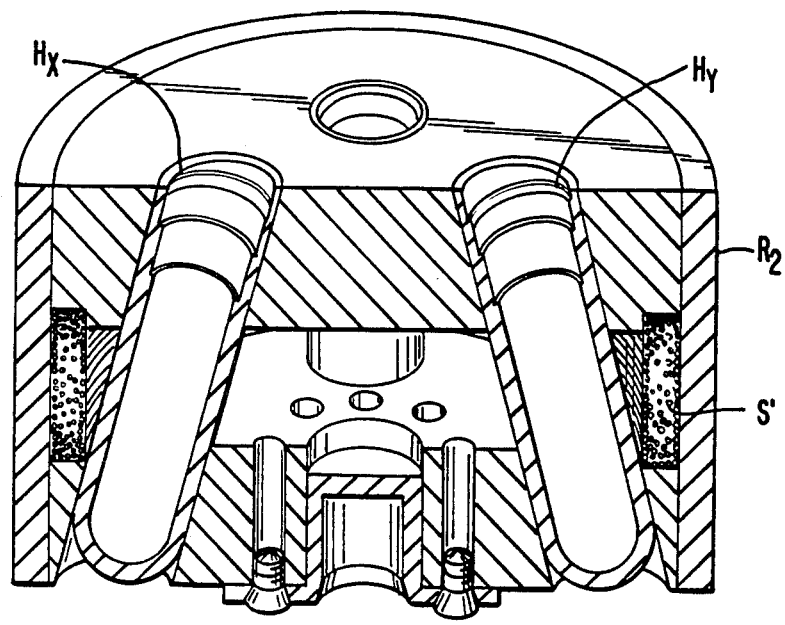
FIG. 6 illustrates the section of an alternative embodiment of the composite rotor of this invention.

Having set forth the embodiment of FIG. 1, short reference will be made to an alternate embodiment of the rotor utilizing the section of FIG. 6. Referring to FIG. 6, a rotor R2 is disclosed. Rotor R2 includes an enlarged spacer belt S′. Further, the respective holes Hx and Hy are shown canted as is common in some centrifuge rotors. The reader will understand that this alternate rotor construction is manufactured by precisely the same techniques. Consequently, the rotor construction of FIG. 6 will not be further discussed herein.

The reader will understand that I have disclosed layers of tape having their fibers extending in one direction for the fabrication of the disks of the rotor assembly. It will be understood that fabric woven with fibers extending substantially straight in more than one direction could as well be used provided that the sequential layers of fabric impart the alternating directions of radial reinforcement here shown.

Figure 7A:
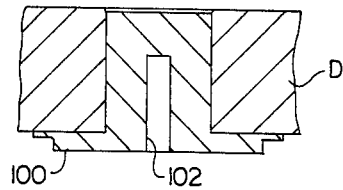
FIG. 7A is a side elevation of a rotor illustrating a shrunk fit hub on the bottom disc.

Referring to FIG. 7A, the single hole 60 in bottom disc D has placed therein a shrunk fit hub 100 with a pilot hole 102 contained therein. Typically, hub 100 is in the order of 1.2 inches in diameter and has an outside diameter that exceeds by 0.0035 to 0.004 of an inch the inside diameter of hole 60 in bottom disc D. Hub 100 is cooled in liquid nitrogen for a suitable period of time and thereafter place within hole 60. Upon return to normal temperature, a socalled shrink fit occurs.

It has been found that excursion of the diameter of hole 60 in the order of 0.0030 of an inch during centrifuge operation in the range of 60,000 rpm can occur. It will thus be seen that by the selection of the hub diameter, all reasonably expected excursions of the rotor can be accommodated. Assuming that one wished to trust this type of attachment, hub 100 as illustrated in FIG. 7A could be sufficient for the mounting of the rotor.

I prefer not to trust the integrity of the rotor hub to a single shrink fit. Therefore, the embodiments of FIGS. 7B and 7C have been developed to assist this shrink fit.

Figure 7B:
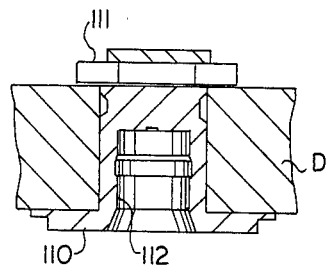
FIG. 7B is a side elevation of a rotor illustrating a shrunk fit hub having an external securing bolt.

Referring to FIG. 7B, hub 110 has been provided having the same diameter dimensions as the hub in FIG. 7A. Here, however, the hub includes a threaded male member extending above the top surface of lower disc D. This threaded male member has a nut 111 placed over the top of the hub 110.

Nut 111 is tightened. It is tightened to an extent so as to firmly compress the top surface of disc D and the bottom surface of disc D at the hub. This nut attachment of the hub 110—in addition to the shrink fit—has been found by me to provide a reliable method of hub attachment.

It will be understood that the method of hub attachment illustrated in FIG. 7B cooperates with the overall construction of the rotor. Specifically, and during the construction of the rotor, bottom disc D is both shrunk fit and bolted to the disc with a pilot hole only therein—similar to the pilot hole illustrated in FIG. 7A. Thereafter, the remaining portions of the rotor including spacer belt S, top disc T, and the winding of the pretensioned out belt B occurs. When this is done, the pilot hole is machined to have that construction necessary to fit a spindle. This construction is illustrated at spindle aperture 112.

It will be understood that the outside of belt B is used as the reference for the concentric machining of the spindle aperture 112. In this way, eccentricities encountered in the original construction are minimized.

Figure 7C:
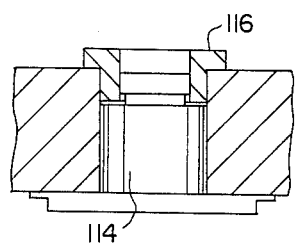
FIG. 7C is a side elevation of a rotor illustrating a shrunk fit hub having an internal securing bolt.

Referring to FIG. 7C, a construction analogous to that of FIG. 7B is illustrated. Here. However, hub 114 is provided with an inside threaded shaft. This inside threaded shaft is mated with a bolt 116 and inwardly extending threads. I prefer this construction where high speed composite material rotors are utilized and the hubs are of generally smaller diameter so as to withstand the dynamic force encountered in the centrifuge.

Figure 7D:
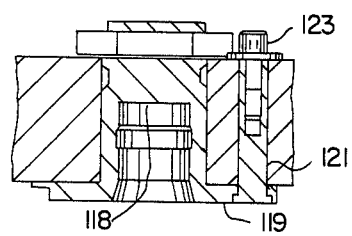
FIG. 7D is a side elevation of a rotor illustrating a shrunk fit hub with expanded annular flange reinforced with bolts transpiercing the bottom disc of the rotor.

Finally, and with reference to FIG. 7D, I illustrated a hub 118 having an expanded lower flange. The reason for the expanded lower flange and its attachment can be simply understood.

As will be apparent below in this application, I prefer the use of interchangeable buckets 40 in holes H. However, many rotor assemblies utilize attached buckets. Where attached buckets are used, the entire rotor must be braced when the sample buckets are opened or closed. This type of bracing requires an enlarged flange 119 for gripping of the rotor at the flange in a vice.

As can be seen in FIG. 7D, such an enlarged flange is illustrated. However, and because of the high forces encountered in dynamic loadings in centrifuges, the flange 119 is reinforced by bolts at 120 degree intervals—with only one of the bolts being shown in FIG. 7D.

Flange 119 is transpierced by bolt 121. Bolt 121 extends through the bottom disc D of the rotor and is captured at the top by nut 123. Nut 123 is here shown having interior threads and can optionally be shrunk fit as hereinbefore described.

Referring to FIG. 8, balancing of the rotor can now be described. The reader should understand that although the solution may at first seem trivial, this was solution was reached after considerable design effort on these problems.

Centrifuge rotors must be designed with minimum reliance placed on the skill of the operator. This is not as an insult to the operator; it is rather part of the required care and safety necessary for making the centrifuge essentially safe under all operating conditions.

Figure 8A:
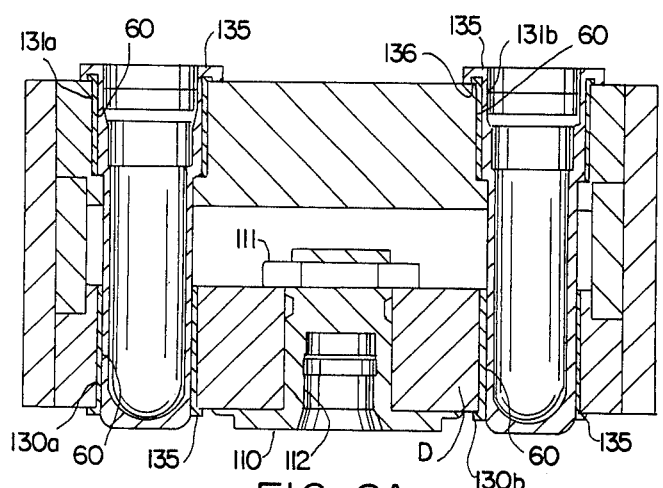
FIG. 8A is a side elevation of the balancing inserts utilized with this invention, the inserts being reinforced by the interchangeable buckets held within the rotor.
Figure 8B:
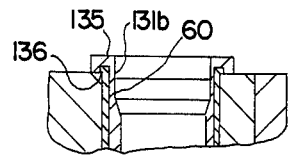
FIG. 8B is a detail of FIG. 8A illustrating the balancing flange of the insert and the under cutting of the sample bucket to enable all sample buckets to be randomly interchangeable without danger of rotor imbalance.

I had considered the possibility of individually balancing the removable sample tubes. Unfortunately, reliance on operators to replace special tubes in nearly indistinguishable holes was not deemed to be prudent. So a method and apparatus had to be designed that would allow free interchangeability between the rotors. FIGS. 8A and 8B illustrates such a solution.

In each of the holes 60 I place a shrink fit balancing insert 131a, 131b, 130a and 130b. Each of the inserts has an outside balancing flange 135. It is from flange 135 that the necessary material is removed to effect balance of the rotor.

Unfortunately, the delicate inserts 131a, 131b, 130a, and 130b will not withstand the dynamic forces of the centrifuge. In the absence of reinforcement, they will peel off and delaminate from the rest of the rotor. This being the case, the inside dimension of these inserts is carefully and uniformly chosen to fit precisely the outside of the sample buckets 40. Thus, the removable feature of the sample buckets coordinates with the required strengthening of the inserts.

The reader will appreciate that the sample buckets must fit within the rotor at the same depth to maintain rotor balance. This must be so even if material is removed from flange 135 at the upper end of the rotor. Thus, the buckets 40 are undercut with an annulus 136 that will accommodate the largest flange 135 that may remain on the inserts after balancing.

The sample buckets 40 are typically digitally machined to high tolerance. Each of the buckets is constrained to be precisely the same weight. Fabrication is made slightly heavy, with the material of the bucket being remove preferably by grinding on the bottom for the removal of material.

What is claimed is:

1. A composite rotor construction comprising in combination a top disk and a bottom disk, each said disk fabricated from laminated layers with longitudinally extending fibers for reinforcing, said fibers bound together with resins;
    said laminated layers having a sequentially repeating pattern of radial directions having different angular orientations with respect to a selected radii extending normal to the spin axis of said rotor, each said laminated layer being normal to the spin axis of said rotor;
    a spacer ring comprising a wound fiber hoop sandwiched between said top disk and said bottom disk to form a rotor assembly; a radial fiber hoop cured to shrink under tension over the periphery of said rotor assembly and overlie the outside surface of said top disk, said bottom disk and said spacer ring therebetween whereby said rotor assembly at said top disk, bottom disk and spacer ring are radially compressed with respect to the spin axis of said rotor equal and opposite to the dynamic forces of radial tension on said rotor; and
    said bottom disk defining a hub aperture;
    a hub placed within said hub aperture in said bottom disk, said hub adapted for fitting into said aperture under a shrink fit.

2. The invention of claim 1 and including a nut fastened to the top surface of said bottom disk at the inside of said rotor for clamping said disk between said nut and hub;
    said nut and hubs defining complementary mating threads for securing said nut to said hub with said disk captured therebetween.

3. The invention of claim 2 and wherein said hub protrudes through said disk at threads for permitting said nut to fit to said bottom disk on outside threads.

4. The invention of claim 1 and wherein said nut includes inside threads interior of said aperture for engaging said threads on said hub.

5. The invention of claim 1 and including a flange attached to said hub, said flange including a plurality of bolts extending from said flange upwardly through said disk.

6. A process of rotor construction comprising the steps of:
    providing a top disk and a bottom disk, each said disk fabricated from laminated layers with longitudinally extending fibers for reinforcing;
    boring a hole centrally of said bottom disk; providing a hub, said hub having a flange for engaging the bottom of said bottom disk on one side and having threads extending through said disk towards the other side of said disk;
    shrink fitting said hub to said bottom disk at a central aperture;
    providing a nut for securing said hub to said bottom disk;
    securing said nut to said bottom disk;
    providing a spacer ring;
    sandwiching said spacer ring between said top disk and said bottom disk to form said rotor assembly and enclose said nut;
    winding a radial fiber loop under tension over the periphery of said rotor assembly and over the outside surface of said top disk whereby said rotor assembly of said top disk, bottom disk and spacer ring are radially compressed;
    centering said rotor with respect to said wound radial fiber hoop; and,
    boring a finished aperture in said hub for a spindle with respect to the centering of said rotor around said wound radial fiber hoop.

7. A composite rotor construction having interchangeable sample buckets comprising in combination a top disk and a bottom disk, each said disk fabricated from laminated layer with longitudinal extending fibers for reinforcing, said fibers bound with resin;
    said top disk and bottom disk including peripheral registered apertures for receiving sample buckets therein;
    inserts for placement within said sample bucket, said inserts having an outside diameter for shrink fitting to said rotor at the top and bottom of said peripheral registered apertures, said inserts having an inside diameter for precisely receiving sample buckets;

a flange on said inserts exposed to the outside of one of said disks for permitting material to be removed to enable balancing of said rotor;

sample buckets for placement in said insert, said sample buckets having an outside diameter conforming to the inside diameter of said inserts whereby said inserts can withstand dynamic loading forces placed on said rotor.

8. The invention of claim 7 and wherein said sample buckets combine an annulus at the upper end thereof, said annulus enabling the flange of said insert to be received under said annulus whereby said sample bucket fits precisely within said rotor at the same depth with respect to said rotor.

9. A process of balancing a composite rotor comprising the steps of providing a top disk and a bottom disk, each said disk fabricated from laminated layers with longitudinally extending fibers for reinforcing;

configuring registered holes in said top disk and bottom disk each said registered hole for receiving a sample bucket;

providing inserts for insertion in said registered holes in said top and bottom disks, said inserts having a flange for protruding upwardly from said bottom, upwardly from said disks;

inserting said inserts at said holes of said disks;

removing material from said flanges in said inserts to balance said rotor;

providing buckets having an outside dimension equivalent to the inside dimension of said inserts; and inserting buckets within said inserts whereby said buckets maintain said inserts from collapse during dynamic loading of said rotor and said centrifuge.

10. The invention of claim 9 and wherein said buckets are provided with an annulus to receive the flange of said insert whereby said buckets have a constant depth of insertion around said rotor.

* * * * *